(12) United States Patent
Rosa et al.

(10) Patent No.: US 11,386,207 B2
(45) Date of Patent: Jul. 12, 2022

(54) METADATA-BASED FLOATING CODE SIGNATURE GENERATION FOR ENDPOINT DEVICES OF A COMPUTER NETWORK

(71) Applicant: EMC IP Holding Company LLC, Hopkinton, MA (US)

(72) Inventors: Martin Rosa, Quebec (CA); Etienne Boucher, Pierrefonds (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 813 days.

(21) Appl. No.: 16/261,791

(22) Filed: Jan. 30, 2019

(65) Prior Publication Data

US 2020/0242245 A1 Jul. 30, 2020

(51) Int. Cl.
G06F 21/00 (2013.01)
G06F 21/56 (2013.01)
G06F 8/30 (2018.01)

(52) U.S. Cl.
CPC .......... G06F 21/566 (2013.01); G06F 8/315 (2013.01); *G06F 2221/034* (2013.01)

(58) Field of Classification Search
CPC ... G06F 21/566; G06F 8/315; G06F 2221/034
USPC ......................................................... 726/23
See application file for complete search history.

(56) References Cited

U.S. PATENT DOCUMENTS

| | | | | |
|---|---|---|---|---|
| 6,658,421 | B1 * | 12/2003 | Seshadri | G06F 9/4488 707/999.1 |
| 7,836,440 | B2 * | 11/2010 | Blackman | G06F 8/433 717/122 |
| 8,116,455 | B1 | 2/2012 | Sussland et al. | |
| 8,402,435 | B1 * | 3/2013 | Spiro | G06F 8/70 717/120 |
| 8,813,189 | B2 | 8/2014 | Li et al. | |
| 8,954,740 | B1 | 2/2015 | Moscaritolo et al. | |
| 9,876,991 | B1 | 1/2018 | Ray et al. | |
| 10,079,810 | B1 | 9/2018 | Moore et al. | |

(Continued)

OTHER PUBLICATIONS

Verizon Enterprise, "Verizon Data Breach Investigations Report (DBIR)," http://www.verizonenterprise.com/DBIR/2015/, 2015, 2 pages.

(Continued)

*Primary Examiner* — Josnel Jeudy
(74) *Attorney, Agent, or Firm* — Ryan, Mason & Lewis, LLP

(57) ABSTRACT

A method comprises detecting a plurality of floating code instances associated with one or more endpoint devices of a computer network, obtaining metadata of each of the floating code instances, and generating floating code signatures for respective ones of the floating code instances based at least in part on their respective metadata. The floating code signatures are utilized to categorize one or more of the floating code instances as at least potentially malicious floating code instances. A given one of the floating code instances illustratively comprises an executable code block dynamically allocated in a memory of a corresponding one of the endpoint devices and does not include any file structure counterpart. The metadata utilized to generate the floating code signature of a given one of the floating code instances illustratively comprises at least one of image hook metadata and thread metadata of the given floating code instance.

20 Claims, 3 Drawing Sheets

(56) References Cited

U.S. PATENT DOCUMENTS

| | | | |
|---|---|---|---|
| 10,353,702 B2* | 7/2019 | Schaefer | G06F 8/41 |
| 2003/0018891 A1 | 1/2003 | Hall et al. | |
| 2004/0078568 A1 | 4/2004 | Pham et al. | |
| 2005/0050362 A1 | 3/2005 | Peles | |
| 2007/0113078 A1 | 5/2007 | Witt et al. | |
| 2007/0289006 A1 | 12/2007 | Ramachandran et al. | |
| 2011/0167273 A1 | 7/2011 | Maas et al. | |
| 2011/0314270 A1 | 12/2011 | Lifliand et al. | |
| 2012/0290829 A1 | 11/2012 | Altman | |
| 2013/0108042 A1 | 5/2013 | Yin | |
| 2013/0198512 A1 | 8/2013 | Rubin et al. | |
| 2014/0115702 A1 | 4/2014 | Li et al. | |
| 2015/0113264 A1 | 4/2015 | Wang et al. | |
| 2016/0119374 A1 | 4/2016 | Williams et al. | |

OTHER PUBLICATIONS

M. Bailey et al., "Automated Classification and Analysis of Internet Malware," Proceedings of the 10th International Conference on Recent Advances in Intrusion Detection (RAID), Sep. 5-7, 2007, pp. 178-197.

U. Bayer et al., "Scalable Behavior-Based Malware Clustering," Network and Distributed System Security Symposium (NDSS), Feb. 2009, 18 pages, vol. 9.

X. Hu et al., "DUET: Integration of Dynamic and Static Analyses for Malware Clustering with Cluster Ensembles," Proceedings of the 29th Annual Computer Security Applications Conference (ACSAC), Dec. 9-113, 2013, pp. 79-88.

X. Hu et al., "MutantX-S: Scalable Malware Clustering Based on Static Features," Proceedings of the USENIX Conference on Annual Technical Conference (ATC), Jun. 26-28, 2013, pp. 187-198.

Mandiant, "Mandiant Exposes APT1—One of China's Cyber Espionage Units & Releases 3,000 Indicators," www.fireeye.co/blog/threat-research/2013/02/mandiant-exposes-apt1-chinas-cyber-espionage-units.html, Feb. 2013, 1 page.

Mandiant, "The OpenIOC Framework," http://www.openioc.org, 2016, 3 pages.

M. Neugschwandtner et al., "FORECAST: Skimming Off the Malware Cream," Proceedings of the 27th Annual Computer Security Applications Conference (ACSAC), Dec. 5-9, 2011, pp. 11-20.

Panda Security, PANDALABS Annual Report 2014, http://press.pandasecurity.com, Jun. 11, 2014, 37 pages.

R. Perdisci et al., "Behavioral Clustering of HTTP-Based Malware and Signature Generation Using Malicious Network Traces," Proceedings of the 7th USENIX Conference on Networked Systems Design and Implementation (NSDI), Apr. 28-30, 2010, 14 pages.

A. Rajaraman et al., Mining of Massive Datasets (Chapter 3), Cambridge University Press, 2011, pp. 73-130.

K. Rieck et al., "Automatic Analysis of Malware Behavior Using Machine Learning," Journal of Computer Security, Dec. 2011, pp. 639-688, vol. 19, No. 4.

stopbadware.org, "What is Badware?" https://www.stopbadware.org/badware, 2016, 2 pages.

wireshark.org, "About Wireshark," https://www.wireshark.org/, Sep. 16, 2016, 5 pages.

RSA, "Detect Unknown Threats. Reduce Dwell Time. Accelerate Response." RSA Netwitness Endpoint, Data Sheet H14904.1, Jun. 2016, 4 pages.

J.B. Althouse et al., "JA3—A Method for Profiling SSL/TLS Clients," https://github.com/salesforce/ja3, 2019, 4 pages.

John Althouse, "Open Sourcing JA3," https://engineering.salesforce.com/open-sourcing-ja3-92c9e53c3c41, Jul. 25, 2017, 5 pages.

U.S. Appl. No. 15/657,812 filed in the name of Zhou Li et al. Jul. 24, 2017 and entitled "Classifying Software Modules Utilizing Similarity-Based Queries."

* cited by examiner

- ImageHook @ ZwUnmapViewOfSection+0x6, Jump Count: 1
- ImageHook @ ZwMapViewOfSection+0x6, Jump Count: 1
- ImageHook @ ZwCreateFile+0x6, Jump Count: 1

FIG. 3A

ImageHook-0_A:332_U:1_N:ntdll.dll_L:ZwCreateFile/6_TS:65536_JC:1_JO:[JMPffe2; SUB; PUSH; MOV], ImageHook-0_A:332_U:1_N:ntdll.dll_L:ZwMapViewOfSection/6_TS:65536_JC:1_JO:[JMPffe2; SUB; PUSH; MOV], ImageHook-0_A:332_U:1_N:ntdll.dll_L:ZwUnmapViewOfSection/6_TS:65536_JC:1_JO:[JMPffe2; SUB; PUSH; MOV]

FIG. 3B

METADATA-BASED FLOATING CODE SIGNATURE GENERATION FOR ENDPOINT DEVICES OF A COMPUTER NETWORK

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets." Attackers are continually attempting to deploy malware and potentially unwanted programs to user devices of a computer network in order to gain access to protected resources.

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

SUMMARY

Illustrative embodiments provide techniques for generation and processing of metadata-based floating code signatures of respective floating code instances of one or more endpoint devices of a computer network. Such embodiments are advantageously configured to utilize the metadata-based floating code signatures in the detection and remediation of malicious activity in order to provide improved security in the computer network. For example, floating code instances known to be associated with malware or potentially unwanted programs can be detected and eliminated or otherwise controlled. The metadata-based floating code signatures can additionally or alternatively be used to initiate various automated actions within the computer network so as to facilitate the provision of a desired level of protection while alleviating the burden on the limited resources of the network security system.

In an illustrative embodiment, a method comprises detecting a plurality of floating code instances associated with one or more endpoint devices of a computer network, obtaining metadata of each of the floating code instances, and generating floating code signatures for respective ones of the floating code instances based at least in part on their respective metadata. The floating code signatures are utilized to categorize one or more of the floating code instances as at least potentially malicious floating code instances.

The method is performed by at least one processing device comprising a processor coupled to a memory. For example, the detecting, obtaining and generating are illustratively performed in each of the one or more endpoint devices of the computer network, possibly with involvement of an associated network security system.

A given one of the floating code instances illustratively comprises an executable code block dynamically allocated in a memory of a corresponding one of the endpoint devices and does not include any file structure counterpart.

The metadata utilized to generate the floating code signature of a given one of the floating code instances illustratively comprises at least one of image hook metadata and thread metadata of the given floating code instance. However, it is to be appreciated that image hook metadata and thread metadata are only examples, and numerous other types of metadata as well as combinations of additional or alternative metadata of multiple distinct types, can be used in illustrative embodiments.

In some embodiments that utilize image hook metadata, generating the floating code signature for the given floating code instance illustratively comprises sorting the image hook metadata using a predetermined sort type, and generating a hash of the sorted image hook metadata. The image hook metadata further comprises at least one of a hook type, a hooked function name and a hooked function offset. It may additionally or alternatively include other types of metadata of the given floating code instance, such as an architecture type, a kernel mode/user mode indicator, an allocated block size, a jump count, a jump instruction, a target function and a target offset. For example, with regard to target functions, the metadata utilized to generate the floating code signature of the given floating code instance illustratively comprises a designated number of initial target functions of the given floating code instance. As indicated previously, numerous other types and arrangements of metadata extracted from or otherwise obtained for floating code instances may be used to generate floating code signatures in other embodiments.

A given set of one or more processing devices configured with functionality for generation and processing of metadata-based floating code signatures as disclosed herein may be implemented, for example, in one or more endpoint devices of a computer network, or in a security analytics system or other type of network security system implemented in or otherwise associated with the computer network, or using a combination of one or more endpoint devices and a network security system.

These and other illustrative embodiments disclosed herein include, without limitation, methods, apparatus, networks, systems and computer program products comprising processor-readable storage media.

BRIEF DESCRIPTION OF THE DRAWINGS

FIG. 3A shows an example of image hook metadata of a floating code instance in an illustrative embodiment.

FIG. 3B shows an example of a fingerprint string generated utilizing the image hook metadata of FIG. 3A in conjunction with generation of a floating code signature based at least in part on the image hook metadata in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
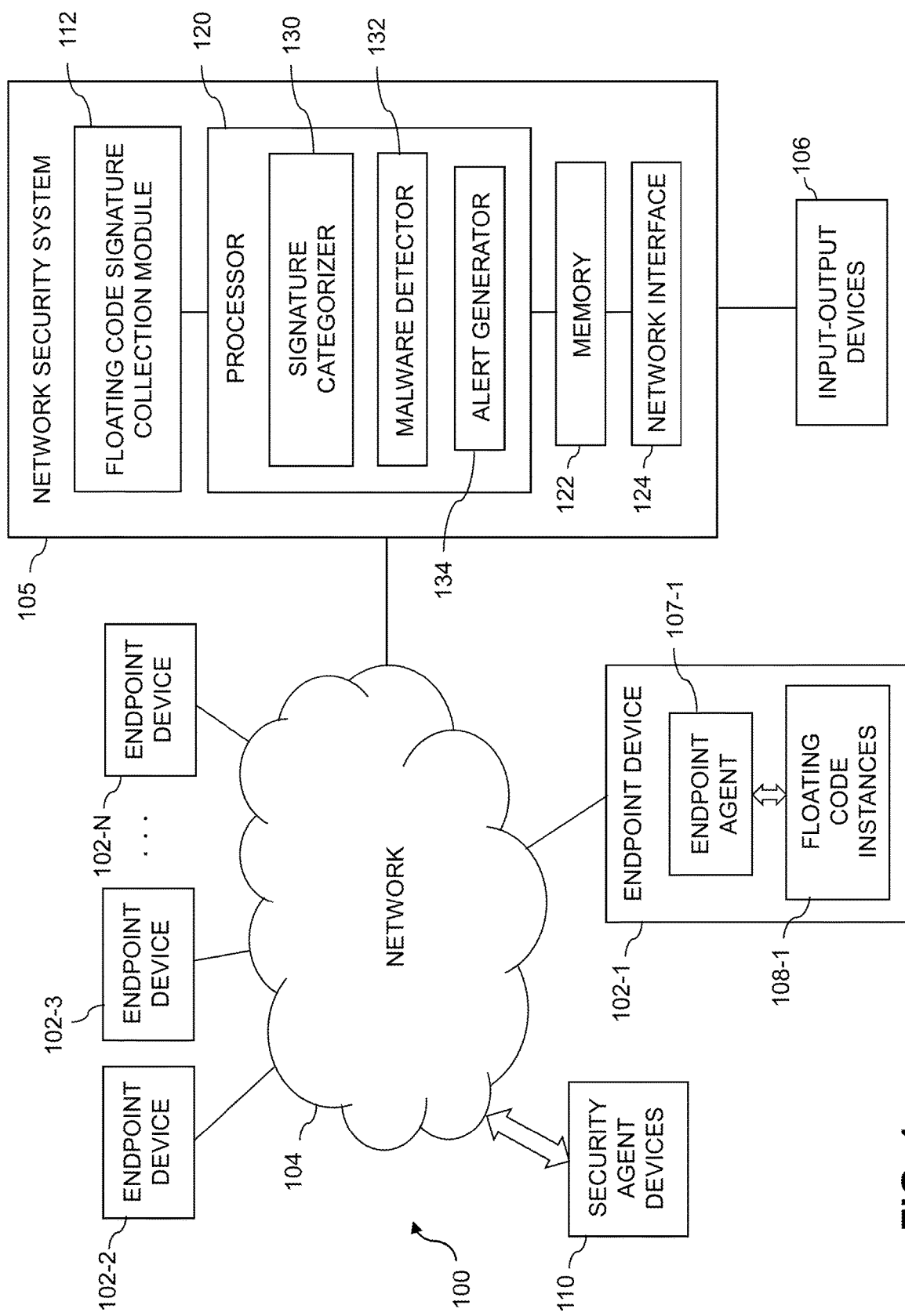
FIG. 1 is a block diagram of a computer network configured for generation and processing of metadata-based floating code signatures for floating code instances of one or more endpoint devices in an illustrative embodiment.

FIG. 1 shows a computer network 100 configured in accordance with an illustrative embodiment. The computer network 100 comprises a plurality of endpoint devices 102-1, 102-2, 102-3, . . . 102-N, collectively referred to herein as endpoint devices 102. The endpoint devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105. The network security system 105 is further coupled to input-output devices 106, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The endpoint devices 102 may comprise, for example, respective user devices such as mobile telephones, laptop computers, tablet computers, desktop computers or other types of devices capable of supporting user access to network resources. For example, users can access various protected resources of the computer network 100 after successful completion of a user login process or other type of user authentication process carried out via one or more of the endpoint devices 102.

Other types of endpoint devices can be implemented in computer network 100, including networked sensors, controllers or other types of Internet of Things (IoT) devices coupled to the network 104. These and other endpoint devices are examples of what are more generally referred to herein as "processing devices." Some of these processing devices are also generally referred to herein as "computers."

The endpoint devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The endpoint devices 102 are configured to communicate with one another over the network 104. In the present embodiment, at least the endpoint device 102-1 is configured to implement an endpoint agent 107-1 configured to interface with floating code instances 108-1 of the endpoint device 102-1. One or more of the other endpoint devices 102 are also assumed to be configured to implement respective endpoint agents configured to interface with their respective floating code instances.

The network security system 105 illustratively comprises or is otherwise associated with a database configured to store entity security data for each of a plurality of distinct entities of the computer network 100. A given such entity illustratively comprises a particular one of the endpoint devices 102, but may more particularly comprise at least one of a file, a machine and a user of the computer network 100. The term "machine" as used herein illustratively refers to one of the endpoint devices 102 or to another type of computer or other processing device of the computer network 100. The term "entity" as used herein is intended to be broadly construed, so as to encompass other elements or components of a computer network, such as a process. A given endpoint device therefore illustratively comprises one or more entities for which entity security data is stored in a database associated with the network security system 105. The term "endpoint device" is also intended to be broadly construed.

The entity security data in some embodiments illustratively comprises user access data, such as network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events.

As a more particular example, a successful access attempt is assumed to represent a login event for the corresponding user identifier and is logged in the database as part of the entity security data. Other types of authentication mechanisms and associated login events or other user access data can be used in other embodiments.

However, it is to be appreciated that the term "entity security data" as used herein is intended to be broadly construed, and should not be viewed as being limited to the above-noted user access data. For example, other types of entity security data utilized in illustrative embodiments can include security logs collected by a security analytics system implemented in the computer network 100.

A database of the type described above is illustratively implemented using one or more storage systems associated with the network security system 105. Such storage systems, although not explicitly shown in the figure, can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include a scale-out all-flash content addressable storage array such as an XtremIO™ storage array from Dell EMC of Hopkinton, Mass. Other types of storage arrays, including by way of example Unity™ all-flash and hybrid flash storage arrays, or VNX® and Symmetrix VMAX® storage arrays, also from Dell EMC, can be used to implement storage systems in other embodiments. Some embodiments additionally or alternatively comprise storage systems implemented at least in part utilizing software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As indicated previously, the entity security data in some embodiments illustratively comprises respective timestamps and other authentication information characterizing successful logins processed in conjunction with users attempting to access protected resources of the computer network 100 via the endpoint devices 102. Other types of login events, network session events or other access events can be processed in computer network 100 in order to generate entity security data.

In the present embodiment, alerts generated by the network security system 105 are provided over the network 104 to one or more security agent devices 110. Such devices, like the endpoint devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the endpoint device in question, or requiring various additional authentication factors for subsequent access attempts made from the endpoint device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, a central processing unit (CPU), an application-specific integrated circuit (ASIC), a field-programmable gate array (FPGA), a graphics processing unit (GPU) or other type of processing circuitry, as well as portions or combinations of such circuitry elements.

The memory 122 illustratively comprises random access memory (RAM), read-only memory (ROM), flash memory or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the endpoint devices 102 and the security agent devices 110, and illustratively comprises one or more conventional transceivers.

The processor 120 further comprises a signature categorizer 130, a malware detector 132 and an alert generator 134.

In operation, floating code instances associated with one or more of the endpoint devices 102 of computer network 100 are detected, and metadata is obtained for each of the floating code instances. These operations are illustratively performed by one or more endpoint agents deployed in respective ones of the endpoint devices 102, such as endpoint agent 107-1 deployed in endpoint device 102-1. The endpoint agents deployed in the respective endpoint devices 102 in the present embodiment are assumed to be in communication with the network security system 105 over the network 104.

The endpoint agents in this embodiment are further configured to generate floating code signatures for the detected floating code instances based at least in part on their respective metadata. For example, the endpoint agent 107-1 deployed in endpoint device 102-1 detects floating code instances 108-1 on the endpoint device 102-1, obtains metadata for each such detected floating code instance, and utilizes the obtained metadata to generate a floating code signature for that floating code instance.

The other endpoint agents are similarly configured to generate floating code signatures for respective floating code instances detected on their corresponding ones of the endpoint devices 102. The resulting floating code signatures are communicated by the endpoint devices 102 to the network security system 105 over the network 104.

Although the endpoint agents of the respective endpoint devices 102 generate the floating code signatures in the present embodiment, this is by way of example only. In other embodiments, the endpoint devices 102 can, for example, detect floating code instances and obtain corresponding metadata, and then transmit the floating code instances and the metadata to the network security system 105 or to another network entity for generation of floating code signatures. Thus, the endpoint agents of the endpoint devices 102 in some embodiments are not configured to generate the floating code signatures, and that functionality is instead implemented at least in part in the network security system 105. The endpoint agents of the endpoint devices 102 and the network security system 105 can therefore cooperatively interact in generating floating code signatures in illustrative embodiments.

The floating code signatures are illustratively utilized in the network security system 105 to categorize one or more of the floating code instances as at least potentially malicious floating code instances. For example, a given one of the at least potentially malicious floating code instances may comprise a floating code instance having a floating code signature that exhibits at least a threshold level of similarity to a particular floating code instance or multiple floating code instances known by the network security system 105 to be associated with at least one of malware and a potentially unwanted program that may be infecting or attempting to infect the corresponding endpoint device.

In some embodiments, a given one of the floating code instances 108-1 detected by the endpoint agent 107-1 comprises an executable code block dynamically allocated in a memory of the endpoint device 102-1. Such an executable code block dynamically allocated in the memory of the endpoint device 102-1 illustratively does not include any file structure counterpart, although other types of dynamically allocated executable code blocks or more generally executables of the endpoint device 102-1 can comprise at least a portion of the floating code instances 108-1 in other embodiments.

The metadata utilized to generate the floating code signature of a given one of the floating code instances 108-1 illustratively comprises at least one of image hook metadata and thread metadata of the given floating code instance.

For example, in an embodiment in which the metadata comprises image hook metadata, generating the floating code signature for the given floating code instance more particularly comprises sorting the image hook metadata using a predetermined sort type, and generating a hash of the sorted image hook metadata. The image hook metadata may comprise at least one of a hook type, a hooked function name and a hooked function offset. A more detailed example of a floating code signature generation using image hook metadata will be described below with reference to FIGS. 3A and 3B.

It is to be appreciated, however, that image hook metadata is not required, and some embodiments utilize other types of metadata in generating floating code signatures, such as the above-noted thread metadata.

As another example, the metadata utilized to generate the floating code signature of a given one of the floating code instances 108-1 can comprise one or more of an architecture type, a kernel mode/user mode indicator, and an allocated block size.

As a further example, the metadata utilized to generate the floating code signature of a given one of the floating code instances 108-1 can comprise at least one of a jump count and a jump instruction.

As yet another example, the metadata utilized to generate the floating code signature of a given one of the floating code instances 108-1 comprises at least one of a target function and a target offset.

In a still further example, the metadata utilized to generate the floating code signature of a given one of the floating code instances 108-1 can comprise a designated number of initial target functions of the given floating code instance.

Various combinations of the above-noted example metadata types can also be used in generating floating code signatures for respective ones of the floating code instances 108-1.

Accordingly, a wide variety of different floating code signatures can be generated in illustrative embodiments, and the term "floating code signature" as used herein is intended to be broadly construed. For example, the term should be understood to encompass a wide variety of different types of information that can uniquely identify a particular floating code instance or category of related floating code instances.

The floating code signature collection module 112 of the network security system 105 collects floating code signatures generated by endpoint agent 107-1 on endpoint device 102-1 and other endpoint agents on other ones of the endpoint devices 102. As mentioned previously, in other embodiments, the network security system 105 may further incorporate one or more signature generators or other functionality for generating floating code signatures utilizing floating code instances and associated metadata provided by the endpoint agents deployed on the endpoint devices 102.

The signature categorizer 130 of processor 120 receives from the floating code signature collection module 112 a plurality of floating code signatures relating to one or more of the endpoint devices 102 of the computer network 100, and categorizes the signatures. For example, the floating code signatures can be arranged by the signature categorizer 130 into a plurality of categories of increasing risk or decreasing risk. Additional information relating to the endpoint devices 102 and their associated files and/or users can be utilized in categorizing floating code signatures for those endpoint devices. Other types of categories can be used, such as categories based on the purported functionality of the floating code instances.

One or more category boundaries may be adjusted periodically as additional floating code signatures are received and categorized. Also, floating code signatures can be moved from one category to another category, possibly based on static or dynamic analysis initiated by the network security system 105.

In the present embodiment, the signature categorizer 130 organizes the collected floating code signatures into categories in order to facilitate subsequent processing in the network security system 105. Different types of subsequent processing can be applied to the floating code signatures in different categories.

The malware detector 132 of processor 120 is illustratively configured to compare floating code signatures of particular categories, such as a high risk category, with one or more known floating code signatures. For example, the malware detector 132 may determine that a floating code signature that exhibits at least a threshold level of similarity to a particular floating code instance or multiple floating code instances known by the network security system 105 to be associated with malware. The malware detector 132 illustratively provides an indication of such a finding to the alert generator 134.

In some embodiments, the functionality of the signature categorizer 130 and the malware detector 132 are at least partially combined. Terms such as "categorize" as used herein are intended to be broadly construed, and can therefore encompass various types of classification of the floating code signatures, such as classification of the signature as being associated with malware or as not being associated with malware. A wide variety of other types of classification or categorization can be used.

The network security system 105 in some embodiments is further configured to initiate at least one automated action relating to one or more of the endpoint devices 102 of the computer network 100 based at least in part on one or more of the floating code signatures categorized by the signature categorizer 130 of processor 120 and further processed by the malware detector 132 of processor 120.

For example, initiating at least one automated action relating to a particular one of the one or more endpoint devices 102 having a floating code instance that is identified by the malware detector 132 as an at least potentially malicious floating code instance illustratively comprises controlling access by the particular endpoint device to the at least potentially malicious floating code instance.

As another example, a given such automated action relating to one or more of the endpoint devices 102 of the computer network 100 illustratively comprises generating an alert in the alert generator 134 responsive to a result of comparing a floating code signature to at least one designated threshold, and transmitting the generated alert to a security agent of the computer network 100. The latter portion of this example automated action illustratively involves transmitting a given generated alert from the network security system 105 via the network interface 124 over the network 104 to at least one of the security agent devices 110. In other embodiments, multiple alerts of different types can be generated based at least in part on the categorization of one or more floating point signatures.

Additional examples of at least one automated action relating to one or more of the endpoint devices 102 of the computer network 100 illustratively comprise one or more of whitelisting, blacklisting or greylisting a floating code instance, quarantining at least one of a floating code instance and an associated machine containing the floating code instance, utilizing the floating code signature in scanning of one or more machines, and disconnecting one or more machines from the computer network 100.

Still other types of automated actions that may be initiated by the network security system 105 based at least in part on one or more floating code signatures include performing at least one of static analysis of a floating code instance and dynamic analysis of a floating code instance.

In some embodiments, the automated action relating to one or more of the endpoint devices 102 of the computer network 100 comprises altering a previous categorization of the floating code signatures of floating code instances of those endpoints and/or altering a manner in which the floating code signatures are categorized.

One or more of the above-noted example automated actions are illustratively initiated based at least in part on a floating code signature, and in some embodiments are more particularly initiated responsive to results of comparing the floating code signature to one or more designated thresholds.

The floating code signatures collected by the network security system 105 in illustrative embodiments advantageously provide enhanced insights into potential security threats faced by the endpoint devices 102 and are illustratively utilized to control the triggering of automated actions to improve security in the computer network 100. For example, such arrangements can facilitate the controlled generation and processing of security alerts in large enterprise computer networks and other types of computer networks and thereby provide increased security against malicious activity.

Additional details regarding the operation of computer network 100 in generating and processing metadata-based floating code signatures will be described below in conjunction with FIG. 2 and FIGS. 3A and 3B.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof. The functionality of the floating code signature collection module 112 of the network security system 105 can similarly be combined with one or more other modules into a single module, separated across a larger number of modules, or implemented using multiple distinct processors.

At least portions of the signature categorizer 130, malware detector 132 and alert generator 134 of the processor 120 may be implemented at least in part in the form of software that is stored in memory 122 and executed by processor 120. Similarly, at least portions of the floating code signature collection module 112 of the network security system 105 can be implemented at least in part in the form of software that is stored in memory 122 and executed by processor 120.

It is to be understood that the particular set of elements shown in FIG. 1 for generating and processing metadata-based floating code signatures for endpoint devices 102 in computer network 100 and for initiating automated actions based at least in part on the generated floating code signatures is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as floating code signature collection module 112, signature categorizer 130, malware detector 132 and alert generator 134 can be implemented elsewhere in the computer network 100.

Although not explicitly shown in the figure, an authentication server may be incorporated into or otherwise associated with the network security system 105 in some embodiments. Login events initiated at respective ones of the endpoint devices 102 are directed to the authentication server over the network 104 for processing. The authentication server determines if a given access attempt is authentic based on presentation of one or more predetermined authentication factors such as user identifiers, passwords or other factors. Upon verification of the presented authentication factors, the authentication server grants the requesting one of the endpoint devices 102 access to one or more protected resources of the computer network 100. A given such authentication server in other embodiments can be implemented at least in part externally to the network security system 105, for example, as a stand-alone server, set of servers or other type of authentication system coupled to the network 104.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system.

For example, other embodiments can implement the network security system 105 and its associated floating code signature collection module 112 as part of or in conjunction with a security information and event management (STEM) system, such as the RSA NetWitness® Platform Evolved STEM, commercially available from RSA, a division of Dell EMC.

Such an SIEM system is also considered another possible example of a "network security system" as that term is broadly used herein. In an embodiment of this type, a database implemented in or otherwise associated with the SIEM system is configured to store entity security data such as security logs collected by the SIEM system.

The endpoint agents of the endpoint devices 102 in some embodiments are part of RSA NetWitness® Endpoint deployment. For example, the endpoint agents in some embodiments can be implemented using respective RSA NetWitness® Endpoint agents suitably modified to generate floating code signatures for respective floating code instances in the manner disclosed herein. Other types of endpoint detection & response (EDR) tools can be used in generating floating code signatures in other embodiments.

An exemplary process, illustratively implemented at least in part utilizing endpoint agents deployed on respective endpoint devices, will now be described in more detail with reference to the flow diagram of FIG. 2. It is to be understood that this particular process is only an example, and additional or alternative processes can be performed at least in part by endpoint agents and/or an associated network security system or other processing platform of a computer network in other embodiments.

In this embodiment, the process illustratively comprises steps 200 through 212. As noted above, at least portions of these steps are assumed to be performed at least in part by endpoint agents deployed on respective endpoint devices, such as endpoint agent 107-1 deployed on endpoint device 102-1, possibly with the involvement of network security system 105.

In step 200, floating code instances are detected in one or more endpoint devices of a computer network.

In step 202, metadata is obtained for the detected floating code instances.

In step 204, floating code signatures are generated for respective ones of the floating code instances based at least in part on their metadata.

Figure 2:
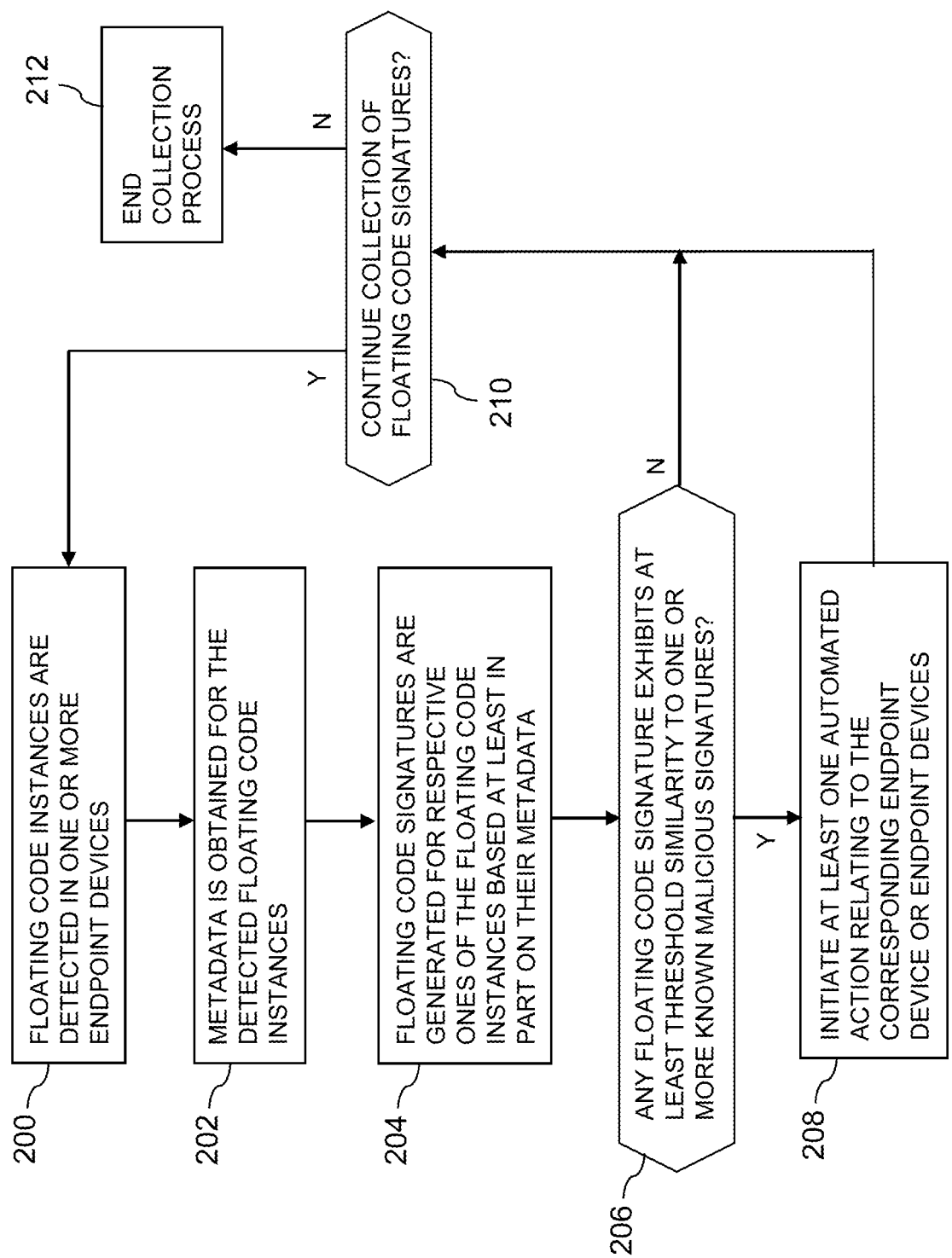
FIG. 2 is a flow diagram of a process that utilizes metadata-based floating code signatures generated for respective floating code instances of one or more endpoint devices in an illustrative embodiment.

More detailed examples of the metadata-based floating code signature generation in step 204 will be presented with reference to FIGS. 3A and 3B following the completion of the general description of the FIG. 2 flow diagram. More particularly, an example of a signature generation algorithm utilizing sorting and hashing operations is described in conjunction with FIGS. 3A and 3B, although numerous other types of signature generation algorithms can be used in other embodiments.

In step 206, a determination is made as to whether or not any floating code signature exhibits at least a threshold similarity to one or more known malicious signatures. If at least one of the floating code signatures exhibits the threshold similarity to one or more known malicious signatures, the process moves to step 208 as shown, and otherwise moves to step 210.

It should be noted that the particular processing operations applied in step 206, and in other steps of the FIG. 2 process, are non-limiting illustrations, and can be varied in other embodiments. For example, although step 206 as shown involves comparing floating code signatures to known malicious signatures (e.g., a blacklist), additional or alternative processing can be applied, such as comparing to known non-malicious signatures (e.g., a whitelist) and/or comparing to potentially malicious signatures (e.g., a greylist). Other embodiments need not involve any such comparisons, but can instead perform other types of categorization or related processing, such as determining how common a particular floating point signature is within a given computer network environment.

In step 208, at least one automated action is initiated relating to the corresponding endpoint device or endpoint devices for which any floating code signature exhibiting the threshold similarity to one or more known malicious signatures was detected in step 206. Particular examples of such automated actions are described elsewhere herein. The process then moves to step 210 as indicated.

In step 210, a determination is made as to whether or not the collection of floating code signatures will continue. If the collection of floating code signatures is to continue, the process returns to step 200 to detect additional floating code instances on one or more endpoint devices, and otherwise moves to step 212 in which the collection process ends.

It should be noted in this regard that the network security system can be configured to process collected floating code signatures in a real-time processing mode of operation, a batch processing mode of operation, or combinations of real-time processing, batch processing or other types of processing modes. For example, the collection of floating code signatures for one or more endpoint devices can be performed over an unbounded time range and/or over one or more bounded time ranges.

Additional instances of steps 200 through 212 can be performed for each of a plurality of other sets of one or more endpoint devices of a computer network.

Numerous other techniques can be used in association with metadata-based floating code signature generation in illustrative embodiments. For example, alternative processes can initiate other types and arrangements of automated actions in response to floating code signatures exhibiting particular characteristics.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to generate metadata-based floating code signatures and to undertake appropriate remediation actions. For example, the ordering of the process steps may be varied in other embodiments, or certain steps may be performed concurrently with one another rather than serially. Also, as indicated previously, multiple instances of the process may be performed for respective different sets of one or more endpoint devices.

Additional examples of metadata-based floating code signature generation will now be described. These examples can be implemented in accordance with the framework of the FIG. 2 process or as part of numerous other processes for metadata-based floating code signature generation.

Referring now to FIG. 3A, an example of image hook metadata of a floating code instance is shown. The floating code instance in this example comprises an executable memory block dynamically allocated in the memory of a remote or local process without any file structure counterpart. Such a floating code instance differs from a floating module instance such as a dynamic linked library (DLL) in that a floating module instance has a file structure, such as portable execution (PE) headers, that can be used to identify it, while the floating code instance does not have a file structure.

Floating code can be used by malware for various malicious purposes, such as performing certain actions (e.g., network communication) on behalf of an injected process in order to make these seem less suspicious from an analyst standpoint. Other examples include patching libraries to weaken the system (e.g., a Kerberos authentication downgrade), and hooking application flow to capture sensitive information (e.g., passwords). Floating code can also be used by file-less malware in order to inject its host (e.g., via PowerShell) and avoid touching the disk to minimize the chances of being detected.

Illustrative embodiments utilize floating code signatures in order to facilitate detection of floating code malware of the type described above. For example, some embodiments substantially reduce the amount of work that would otherwise need to be performed by a network security system and/or one or more associated security agents in order to assess a computer network environment for floating code malware issues. This is achieved at least in part by uniquely identifying floating code instances across processes as well as across machines, utilizing floating code signatures of the type disclosed herein. As mentioned previously, this can involve, for example, blacklisting known malicious floating code signatures, whitelisting known non-malicious floating code signatures and/or greylisting other floating code signatures, as well as numerous other types of processing.

It should be noted in this regard that directly hashing the floating code instance itself may not provide an acceptable floating code signature in some embodiments, as the floating code often varies due to relocation issues and other factors. In addition, because data is sometimes stored inside the memory block of a given floating code instance, and such data is likely to vary from instance to instance even if the corresponding floating code is otherwise exactly the same, direct hashing of the floating code instance itself may not provide a floating code signature having the desired uniqueness.

Illustrative embodiments address these and other issues by utilizing metadata of a given floating code instance in generating its floating code signature. This allows a sufficiently unique signature to be generated for a given unique floating code instance, with repeatability of the signature for multiple instances of the same or substantially the same floating code.

Various types of metadata utilized in some embodiments have been described elsewhere herein, but in the context of the examples of FIGS. 3A and 3B more particularly include at least a subset of the following:

1. Type of hook (e.g., inline hook, import address table (IAT) hook, export address table (EAT) hook)
2. Architecture (e.g., x86, AMD64)
3. Ring (e.g., kernel mode or user mode)
4. Hooked image (e.g., kernel32.dll)
5. Allocated block size (e.g., 8192)
6. Hooked function name if nearby (e.g., CreateFileW, KERNEL32.DLL!MoveFileExW, . . . ) plus offset in the function (e.g., +0x5)
7. Jump count
8. Jump instruction op-codes and/or mnemonics used to implement the hook
9. First X target function instruction op-codes and/or mnemonics
10. Offset in the target block of allocated memory (e.g., 0x100)

The example of FIG. 3A shows image hook metadata for a particular floating code instance allocated in a process at address range 0x12000-0x22000. It is assumed for this example that the above-noted variable X is set to X=3, although other values can be used. As a result, the three image hooks shown in the figure are utilized in generating the floating code signature for the floating code that includes those image hooks. In order to ensure repeatability of the signature, so that other floating code instances with substantially the same image hook metadata will produce substantially the same signature, the following signature generation algorithm is applied in the present example:

1. Alphabetically sort the individual image hook metadata to generate a fingerprint string.
2. Hash the fingerprint string to obtain the signature.

FIG. 3B shows the resulting fingerprint string after the alphabetical sorting in step 1 of the above signature generation algorithm. Other types of predetermined sorting can be used in other embodiments in place of the alphabetical sorting of the present examples.

The hash operation in step 2 of the signature generation algorithm illustratively comprises a cryptographic hash (e.g., an MD5 or SHA256 hash). Alternative functions can be used in place of hashing the sorted image hook metadata.

The use of image hook metadata in the present examples is non-limiting as well. For example, other types of floating code signatures can be generated using thread metadata rather than image hook metadata. Numerous other types of metadata can be used, and the term "metadata" is therefore intended to be broadly construed.

As mentioned previously, the floating code signatures are illustratively generated by endpoint agents of respective endpoint devices and delivered to a network security system over a network, although other arrangements are possible. For example, the floating code instances and their respective metadata can be captured by the endpoint agents and sent to a network security system or other network entity for generation of the signatures.

These examples illustrate that embodiments disclosed herein can effectively characterize floating code instances that involve dynamically allocated memory blocks so as to facilitate the detection of floating code malware. Additional or alternative processing can be applied. For example, a network security system can be configured to perform hook profiling in order to determine similarity of floating code instances based at least in part on the particular functions that are hooked. Such processing in some embodiments can utilize fuzzy hashing (e.g., an SSDEEP hash) on the hooked functions.

As mentioned previously, metadata-based floating code signatures generated as disclosed herein can be used to control the performance of a wide variety of different automated actions in a computer network.

For example, the computer network can be configured to perform particular automated actions responsive to results of comparing a floating code signature to one or more designated thresholds, such as quarantining a corresponding floating code instance, scanning other machines for the presence of the floating code instance, performing static analysis (e.g., reverse engineering and matching of code of the floating code instance), and/or performing dynamic analysis (e.g., in a sandbox environment).

Other examples of automated actions include using results of static analysis and/or dynamic analysis to modify a categorization of one or more floating code signatures and/or altering a manner in which floating code signatures are categorized. Such decisions can be based at least in part on statistics gathered for multiple ones of the endpoint devices 102 of the computer network 100 over time.

As more particular examples, one or more of the following automated actions can be performed based at least in part on the floating code signature of a given floating code instance:

1. Automatically whitelist, blacklist or greylist the floating code signature;

2. Add the floating code signature to one or more central repositories of such signatures for use in automatic scanning of machines;

3. Quarantine the floating code instance and/or the machine on which the floating code instance was found;

4. Scan machines (e.g., a subset of the endpoint devices 102) for presence of floating code instances with a specific floating code signature;

5. Disconnect one or more machines, subnets or an entire network;

6. Send the floating code instance for automatic dynamic analysis in a sandbox environment or to be automatically reverse-engineered and analyzed.

7. Utilize results of analysis to adjust the categorization of floating code signatures and/or automated actions performed based on categorization of those signatures.

8. Maintain statistics for accuracy of various floating code signatures as indicators of the presence of malicious activity and adjust their respective categorizations.

Although the above examples of automated actions are illustratively defined for a given floating code instance and its corresponding floating code signature, similar actions can be performed for other types of computer network entities, such as files, machines and/or users.

In other embodiments, alternative arrangements can be used to implement metadata-based floating code signature generation.

It should therefore be understood that the particular metadata-based floating code signature generation techniques described above are exemplary only, and numerous alternative arrangements can be used in other embodiments. The various characteristics of the illustrative embodiments should not be construed as limiting in any way.

The above-described illustrative embodiments provide significant advantages relative to conventional approaches.

For example, some embodiments provide techniques for generation and processing of metadata-based floating code signatures of respective floating code instances of one or more endpoint devices of a computer network.

Such embodiments are advantageously configured to utilize the metadata-based floating code signatures in the detection and remediation of malicious activity in order to provide improved security in the computer network.

For example, floating code instances known to be associated with malware or potentially unwanted programs can be detected and eliminated or otherwise controlled.

The metadata-based floating code signatures can additionally or alternatively be used to initiate various automated actions within the computer network so as to facilitate the provision of a desired level of protection while alleviating the burden on the limited resources of the network security system.

For example, such arrangements can facilitate the controlled generation and processing of security alerts in large enterprise computer networks and other types of computer networks and thereby provide increased security against malicious activity.

Metadata-based floating code signatures generated in the manner disclosed herein facilitate provision of security functionality for potentially vast numbers of distinct endpoint devices, in a wide variety of different security applications and use cases.

The disclosed arrangements therefore provide enhanced security against attacks in enterprise computer networks. For example, the metadata-based floating code signatures generated in illustrative embodiments can facilitate detection of an attack at an early stage of penetration before an attacker can cause further damage from within an internal network of an enterprise.

It is to be appreciated that the particular advantages described above and elsewhere herein are associated with particular illustrative embodiments and need not be present in other embodiments. Also, the particular types of computer network features and functionality as illustrated in the drawings and described above are exemplary only, and numerous other arrangements may be used in other embodiments.

It was noted above that portions of a computer network as disclosed herein may be implemented using one or more processing platforms. Illustrative embodiments of such platforms will now be described in greater detail. These and other processing platforms may be used to implement at least portions of other computer networks in other embodiments. A given such processing platform comprises at least one processing device comprising a processor coupled to a memory.

One illustrative embodiment of a processing platform that may be used to implement at least a portion of a computer network comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the computer network.

These and other types of cloud infrastructure can be used to provide what is also referred to herein as a multi-tenant environment. One or more platform components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of Linux container (LXC) implemented using a kernel control group. The containers may run on virtual machines in a multi-tenant environment, although other arrangements are possible. The containers may be utilized to implement a variety of different types of functionality within the computer network 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of a computer network comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, a CPU, an ASIC, an FPGA, a GPU or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a computer network as disclosed herein. Such components can communicate with other elements of the computer network over any type of network or other communication media.

As indicated previously, components of a computer network as disclosed herein can be implemented at least in part in the form of one or more software programs stored in memory and executed by a processor of a processing device. For example, at least portions of the functionality of modules 112, 130, 132 and 134 of the network security system 105 are illustratively implemented in the form of software running on one or more processing devices.

It should again be emphasized that the above-described embodiments are presented for purposes of illustration only. Many variations and other alternative embodiments may be used. For example, although described in the context of particular computer network and processing device configurations, the techniques for metadata-based floating code signature generation as disclosed herein are applicable to a wide variety of other types of computer networks and processing device configurations. Also, different types and arrangements of endpoint devices, endpoint agents, network security systems, floating code instances, floating code signatures, automated actions and other modules, components, operations and parameters can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   detecting a plurality of floating code instances associated with one or more endpoint devices of a computer network;
   obtaining metadata of each of the floating code instances; and
   generating floating code signatures for respective ones of the floating code instances based at least in part on their respective metadata;
   wherein the floating code signatures are utilized to categorize one or more of the floating code instances as having at least a specified maliciousness; and
   wherein the method is performed by at least one processing device comprising a processor coupled to a memory.

2. The method of claim 1 wherein said at least one processing device comprises at least a portion of a given one of the one or more endpoint devices.

3. The method of claim 1 wherein said at least one processing device comprises at least a portion of a network security system that communicates with the one or more endpoint devices in the computer network.

4. The method of claim 1 wherein a given one of the floating code instances comprises an executable code block dynamically allocated in a memory of a corresponding one of the endpoint devices.

5. The method of claim 4 wherein the executable code block dynamically allocated in the memory of the corresponding one of the endpoint devices does not include any file structure counterpart.

6. The method of claim 1 wherein a given one of the one or more floating code instances having at least the specified maliciousness comprises a floating code instance having a floating code signature that exhibits at least a threshold level of similarity to a floating code instance known to be associated with at least one of malware and an unwanted program.

7. The method of claim 1 wherein the metadata utilized to generate the floating code signature of a given one of the floating code instances comprises at least one of image hook metadata and thread metadata of the given floating code instance.

8. The method of claim 7 wherein generating the floating code signature for the given floating code instance comprises:
sorting the image hook metadata using a predetermined sort type; and
generating a hash of the sorted image hook metadata.

9. The method of claim 7 wherein the image hook metadata further comprises at least one of a hook type, a hooked function name and a hooked function offset.

10. The method of claim 1 wherein the metadata utilized to generate the floating code signature of a given one of the floating code instances comprises one or more of:
an architecture type;
a kernel mode/user mode indicator; and
an allocated block size.

11. The method of claim 1 wherein the metadata utilized to generate the floating code signature of a given one of the floating code instances comprises at least one of a jump count and a jump instruction.

12. The method of claim 1 wherein the metadata utilized to generate the floating code signature of a given one of the floating code instances comprises at least one of a target function and a target offset.

13. The method of claim 1 wherein the metadata utilized to generate the floating code signature of a given one of the floating code instances comprises a designated number of initial target functions of the given floating code instance.

14. The method of claim 1 further comprising initiating at least one automated action relating to a particular one of the one or more endpoint devices that is identified as including at least one of the one or more floating code instances categorized as having at least the specified maliciousness, wherein the automated action comprises controlling access by the particular endpoint device to the at least one of the one or more floating code instances.

15. An apparatus comprising:
at least one processing device comprising a processor coupled to a memory;
said at least one processing device being configured:
to detect a plurality of floating code instances associated with one or more endpoint devices of a computer network;
to obtain metadata of each of the floating code instances; and
to generate floating code signatures for respective ones of the floating code instances based at least in part on their respective metadata;
wherein the floating code signatures are utilized to categorize one or more of the floating code instances as having at least a specified maliciousness.

16. The apparatus of claim 15 wherein the metadata utilized to generate the floating code signature of a given one of the floating code instances comprises at least one of image hook metadata and thread metadata of the given floating code instance.

17. The apparatus of claim 16 wherein generating the floating code signature for the given floating code instance comprises:
sorting the image hook metadata using a predetermined sort type; and
generating a hash of the sorted image hook metadata.

18. A computer program product comprising a non-transitory processor-readable storage medium having stored therein program code of one or more software programs, wherein the program code when executed by at least one processing device causes said at least one processing device:
to detect a plurality of floating code instances associated with one or more endpoint devices of a computer network;
to obtain metadata of each of the floating code instances; and
to generate floating code signatures for respective ones of the floating code instances based at least in part on their respective metadata;
wherein the floating code signatures are utilized to categorize one or more of the floating code instances as having at least a specified maliciousness.

19. The computer program product of claim 18 wherein the metadata utilized to generate the floating code signature of a given one of the floating code instances comprises at least one of image hook metadata and thread metadata of the given floating code instance.

20. The computer program product of claim 19 generating the floating code signature for the given floating code instance comprises:
sorting the image hook metadata using a predetermined sort type; and
generating a hash of the sorted image hook metadata.

* * * * *